United States Patent
Graylin et al.

(10) Patent No.: US 10,924,605 B2
(45) Date of Patent: Feb. 16, 2021

(54) SYSTEM AND METHOD FOR ASYNCHRONOUS MULTI-MODE MESSAGING

(71) Applicant: ONVOCAL, INC., Northborough, MA (US)

(72) Inventors: William Wang Graylin, Winchester, MA (US); Bogdan Sima, Northborough, MA (US); Pichrachana Sun, Northborough, MA (US); Andrew Molloy, Northborough, MA (US)

(73) Assignee: ONVOCAL, INC., Woburn, MA (US)

( * ) Notice: Subject to any disclaimer, the term of this patent is extended or adjusted under 35 U.S.C. 154(b) by 0 days.

(21) Appl. No.: 15/867,963

(22) Filed: Jan. 11, 2018

(65) Prior Publication Data

US 2018/0359349 A1 Dec. 13, 2018

Related U.S. Application Data

(60) Provisional application No. 62/517,384, filed on Jun. 9, 2017.

(51) Int. Cl.

| H04W 4/00 | (2018.01) |
|---|---|
| H04M 1/725 | (2021.01) |
| H04W 4/12 | (2009.01) |
| G10L 15/18 | (2013.01) |
| G10L 15/22 | (2006.01) |
| G10L 13/00 | (2006.01) |

(52) U.S. Cl.
CPC ........... *H04M 1/7255* (2013.01); *G10L 13/00* (2013.01); *G10L 15/1815* (2013.01); *G10L 15/22* (2013.01); *H04M 1/72552* (2013.01); *H04W 4/12* (2013.01); *G10L 2015/223* (2013.01); *H04M 2250/74* (2013.01)

(58) Field of Classification Search
CPC ......... G06F 3/167; G10L 15/22; G10L 15/26; H04W 68/005
See application file for complete search history.

(56) References Cited

U.S. PATENT DOCUMENTS

| 9,060,257 B1 * | 6/2015 | Izdepski ................ H04W 4/12 |
|---|---|---|
| 9,412,394 B1 * | 8/2016 | Yuasa ................. H04M 1/6083 |
| 2006/0069569 A1 | 3/2006 | Knott et al. |
| 2010/0041447 A1 | 2/2010 | Graylin |
| 2010/0144329 A1 | 6/2010 | Lasensky et al. |
| 2011/0144989 A1 * | 6/2011 | Dowlatkhah ......... H04L 51/066 704/235 |

(Continued)

FOREIGN PATENT DOCUMENTS

WO 2005/109661 A1 11/2005

*Primary Examiner* — Omoniyi Obayanju
(74) *Attorney, Agent, or Firm* — Seyfarth Shaw LLP; Brian Michaelis; Elias Larson

(57) ABSTRACT

Systems and methods for providing and facilitating multi-mode communication are disclosed. Users may initiate, receive and/or respond to messages and message notifications on a computing device using multi-mode interactions executed through either a device display or a wearable device such as a headset with enhanced functionality. Contextual prompts guide the user interaction with the computing device using on-board or remote voice recognition text-to-speech and speech-to-text processing and playback. Voice and text data are packaged and transmitted to the network.

23 Claims, 13 Drawing Sheets

(56) References Cited

U.S. PATENT DOCUMENTS

2013/0275899 A1* 10/2013 Schubert ............... G06F 3/0481
                                                    715/765
2016/0077718 A1*  3/2016 Kwon .................. G06F 1/1694
2017/0199867 A1*  7/2017 Koji ..................... G06F 17/271
2018/0182380 A1*  6/2018 Fritz ................... G10L 15/1815

* cited by examiner

SYSTEM AND METHOD FOR ASYNCHRONOUS MULTI-MODE MESSAGING

RELATED APPLICATIONS

This application claims the benefit of U.S. Provisional Patent Application Ser. No. 62/517,384 filed on Jun. 9, 2017, the contents of which are incorporated herein by reference in its entirety.

FIELD

This disclosure relates to a messaging and notification system and more specifically, to systems and methods for communication using voice, video and/or text interaction between devices.

BACKGROUND

Replying to or initiating asynchronous messages (such as text, chat, email, social media messaging) today on mobile devices requires typing on small keyboards or recording voice files to generate either a text output, or an audio output, but not both voice and text outputs together, thus limiting how a user can receive and respond to messages. For example, when a user receives a text-only message, the user may be occupied driving, walking or otherwise unable to read the message and/or type a response. Similarly, when a user receives a voice-only message, the user may be in a meeting, church, noisy environment, or other circumstance in which the user is not in a position to hear the message. Traditional single-mode communication protocols make it difficult for the user to communicate in many environments and even dangerous or illegal in other environments.

Messaging applications today allow users to type in text via small keyboards inside the app, or inside a push notification window in the device home or lock screen. Some keyboards or voice commands apps allow voice to be translated into text (voice-to-text), for users to dictate a text only message to the recipient that can be read but not heard. Some applications allow users to record a voice file, and send an audio only message to the recipient that can be heard but not read. Certain applications provide for notifications that allow users to respond by interacting with the notification itself. For example, an SMS/MMS or social media chat application may present notifications that allow the user to respond to the notification by simply tapping on the notification and/or typing a response directly in the notification window. No solution currently exists, however, for a combination of voice and text response to application push notifications. There is also no present solution allowing users to initiate text or chat messages, where either typing or speaking generates the content of the message and both text and audio are delivered to the recipient of the content as a multi-mode interaction.

Currently, voice based interactions with mobile device applications are limited to either a voice-only message, or a text-only message generated from voice-to-text conversion. These voice services typically require the user to register with each individual platform or system and might be limited based on the hardware device chosen. None of the current systems allow for either text or voice modes of entry while generating both text and voice modes of delivery (i.e., multi-mode interactions). None of the current systems allow hands-free interaction and conversations through voice notifications and responses via connected devices like headphones, speakers, or via the phone's speaker itself when the app is put into hands-free mode.

SUMMARY

The present disclosure provides a safer, easier, and more convenient way to communicate that provides both voice and text together and allows users to receive and respond to messages in various ways, such as inside an application, from a notification screen, or with the use of headset, depending on the user's situation or environment. The present disclosure provides for a combination of voice and text response to messaging apps or application push notifications, where users can initiate or respond to asynchronous messages, by either typing or speaking the content to generate the message and both text and audio are delivered to the recipient of the content as a multi-mode interaction with both voice and text. This multi-mode messaging solution and method is referred to herein as "Voice Text" or "Voice Texting."

Aspects of the present disclosure provide improved communication devices that overcome technical difficulties associated with inter-device communication. Aspects of the present disclosure overcome technical inaccuracies of transmitted messages as well as providing a technical solution to latency and lag in between receipt and response of asynchronous messages. The disclosure provides a system configured to establish communication between two or more users with multiple modes of communication that improve accuracy and response-time, as well improve upon the user-experience of inter-device communication.

The system and methods described herein address the increased human desire for more natural and spoken engagement with technology, and the need for faster, more efficient, and more accurate systems and methods to seamlessly initiate and respond to communications between computing device users. The systems and methods disclosed herein facilitate a communication session between two or more users utilizing text, voice, voice-to-text and text-to-voice capabilities.

Systems and methods for asynchronous, multi-mode communication are provided. The system may include an input/output module configured to receive a first voice input from a user and a speech recognition module configured to receive the first voice input and translate the first voice input from speech to text. The system may further include a context module configured to determine an intent based on the text and a memory configure to store the voice input and text. A messaging module may be configured to generate a message package and transmit the message package to a network. The message package may be based on the determined intent and comprising both the stored voice input and text.

An exemplary method for asynchronous multi-mode messaging is also provided. According to one aspect, the method may include receiving a first voice input from a user and translating the first voice input from speech to text. A context-based intent may be determined from the text and the voice input and text are stored in memory. A message package may be generated and transmitted to a network. The message package may be based on the determined intent and comprising both the stored voice input and text.

Additional aspects of the invention include systems and methods to provide interactive voice and text communication, with through wearable devices, such as user-worn smart headsets, without requiring the user to open the application or touch the phone or tablet at all. Further, the present disclosure provides an ability to aggregate certain notifications and make those notifications interactive using voice dialog (i.e., text-to-voice, voice-to-text and voice-only) through a command button on wearable devices, such as headsets. Notifications are made interactive using push notifications from an app independent of hardware but allowing one touch voice responses as well as one touch action responses.

Additional aspects of the disclosure provide a voice reply facility using buttons on a device screen, and command buttons on a headset as well as features providing the ability to execute an interaction with a user through voice reply, with a default time delay value, as a way of leveraging the same button to play the notification and wait for a response. The addition of a quick-talk, walkie-talkie-like feature provides an additional intelligent, interactive voice notification function, obviating any need for a dedicated walkie-talkie application or device. Such a feature provides a conversational interaction across any application or service connected to the application.

DESCRIPTION OF THE DRAWINGS

The present disclosure is described with respect to particular exemplary embodiments thereof and reference is accordingly made to the drawings in which.

DETAILED DESCRIPTION

Figure 1:
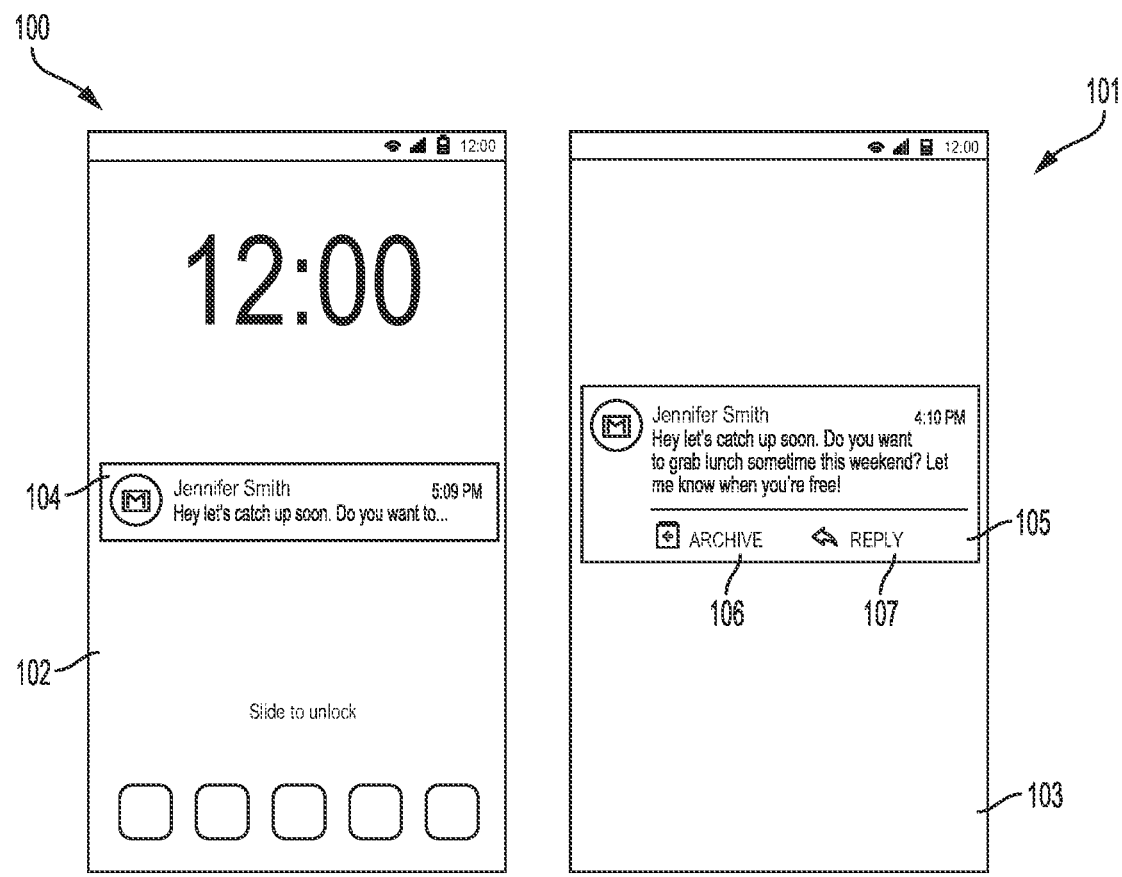
FIG. 1 depicts display diagrams of a lock screen of a mobile device displaying a traditional messaging notification.

Aspects of the disclosure will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Enhancements in mobile device technology have generated many ways for users to quickly view and access information on the mobile device, or information communicated to the mobile device from another user. In particular, push notifications and interactive notification windows are now ubiquitous on mobile devices, such as mobile phones, tablets, and even laptop computers. Aspects of the present invention provide for asynchronous interactions between two or more users combining both voice and text data to establish faster, accurate and efficient device-to-device communication. Aspects of the present disclosure include systems and methods of generating, transmitting and managing asynchronous messages including both voice data and text data (referred to herein as a "voice text" or "voicetext") between multiple computing devices. The term "computing device" or "device" as used herein may include any computing device capable of and configured to execute applications and send and transmit messages as described herein, including without limitation smartphones, mobile telephones, tablets, phablets, laptops, personal digital assistants, smart devices, wearables or the like.

FIG. 1 depicts display diagrams 100, 101 of a lock screen 102, 103 of a mobile device displaying a traditional message notification 104, 105. Traditional inter-device communication involved either typing a text message or recording a voice message. In some cases the voice file would be transmitted and in other cases, a voice-to-speech translation occurs in which the translated text is sent. Receipt of either message typically results in a push message notification 104, 105 generated and displayed by the recipient device. When a mobile device is in a locked state and the device receives a push notification or other message for which the mobile device is programmed to display or otherwise alert a user, a brief or truncated notification message 104 may appear on the lock screen 102. Upon noticing the notification the user may tap, or press on the notification message 104. The device display, in response to the user input, may display an expanded notification message 105 that includes additional message content and one or more response action buttons, such as an "Archive" button 106 or a "Reply" button 107. The user may opt to manage or respond to the notification in the lock-screen without taking the additional steps of unlocking the phone, opening up the appropriate application, and then handling the message through the native application. For example, pressing or tapping the "Archive" button 106 may save the message in a message archive, after which the expanded notification message 105 is no longer displayed. Pressing or tapping the "Reply" button 107 may open a text box or other input box in or below the notification message window 105. The user may then type a response and send it directly from the lock screen.

Figure 2:
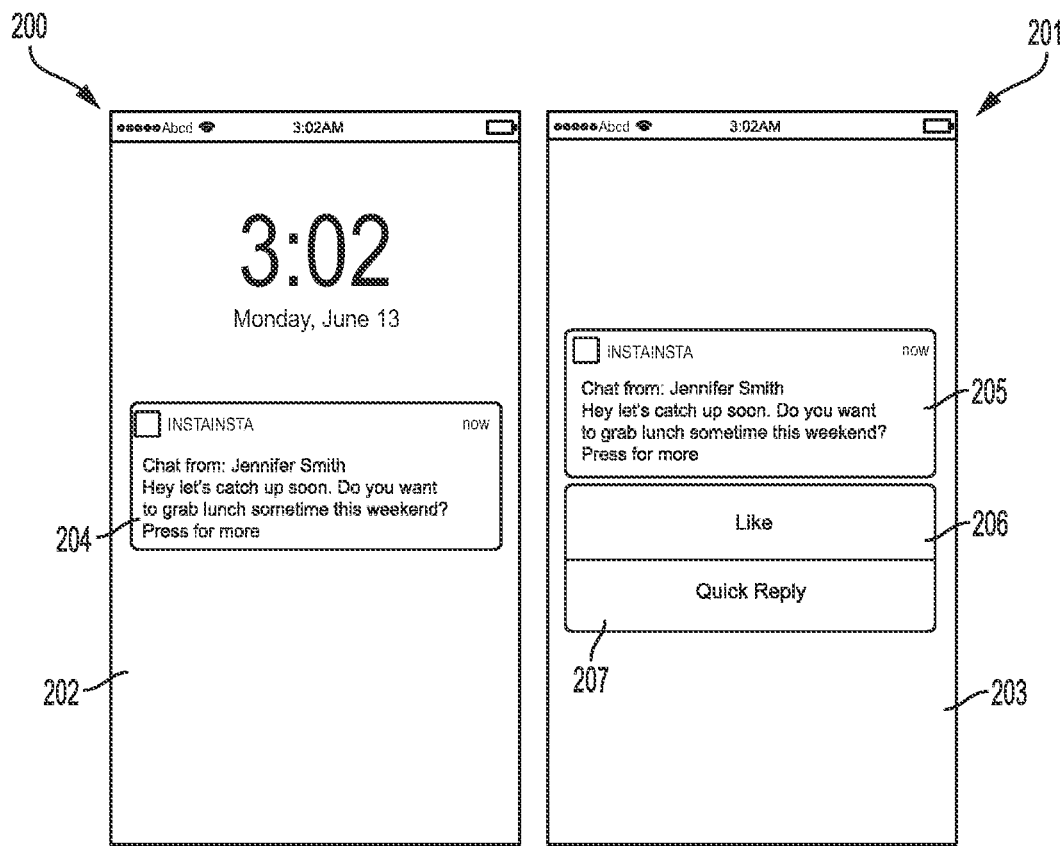
FIG. 2 depicts display diagrams of a lock screen of a mobile device displaying a traditional messaging notification.

FIG. 2 depicts display diagrams 200, 201 of a lock screen 202, 203 of a mobile device displaying a traditional message notification 204, 205. Like the traditional message notification described in connection with FIG. 1, a mobile device in a locked state may receive a notification message to be displayed on the lock screen 202, 203. In the depiction of FIG. 2, the notification message 204, 205 may be truncated and upon receiving a tap or press from the user, the device may display one or more options for managing the notification. For example, the lock-screen 203 display may display a second window listing a "Like" button 206 allowing the user to promote or otherwise note the user's endorsement of the message. The lock-screen 203 may also present a "Quick Reply" button 207 which, as previously described, may allow the user to respond directly to the message from the lock-screen 203 without having to unlock the device and invoke the native application.

Figure 3:
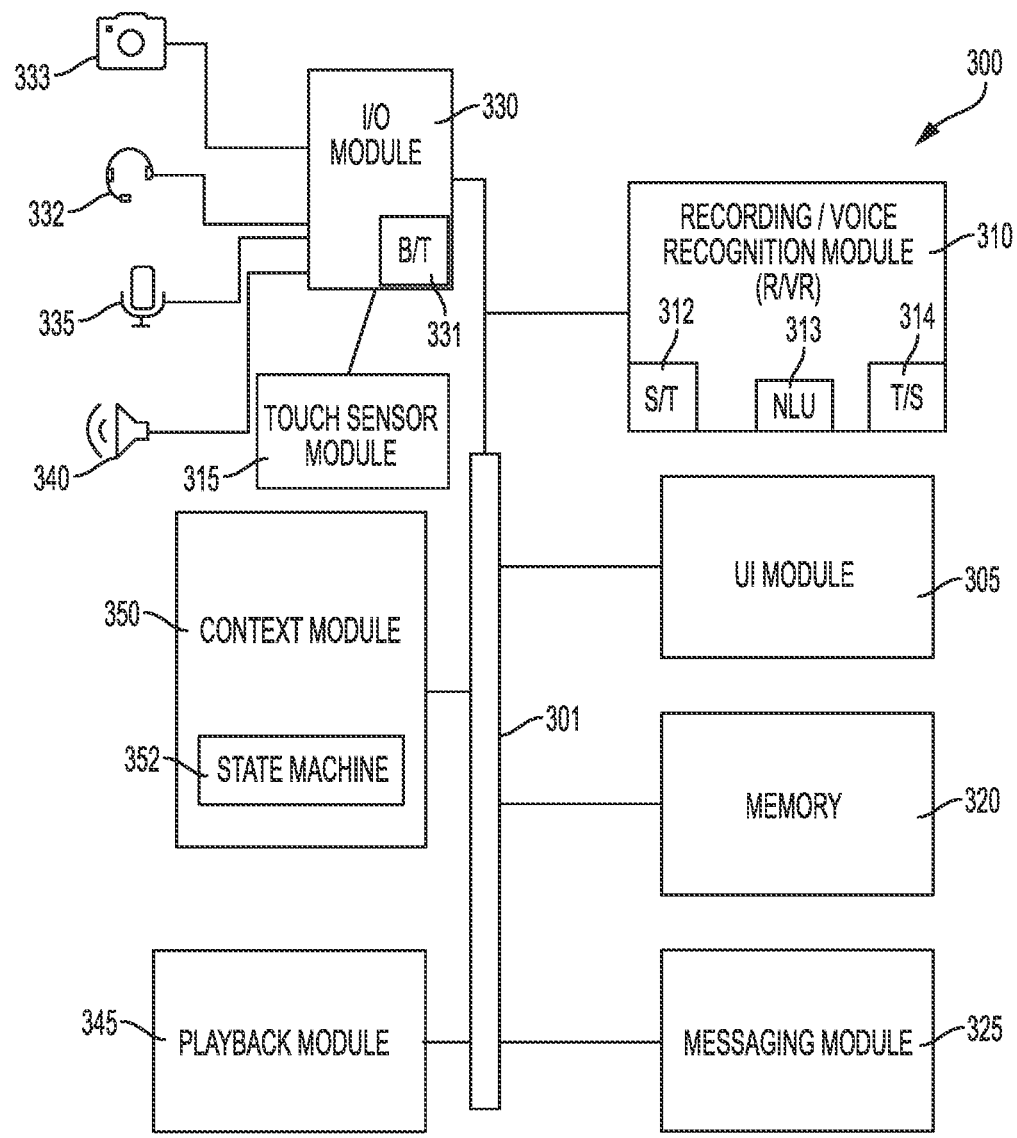
FIG. 3 is a block diagram of a system for implementing synchronous multi-mode communication or messaging, according to one aspect of the present disclosure.

FIG. 3 is a block diagram of a system for implementing asynchronous, multi-mode communication, according to one aspect of the disclosure. The modules of the system may include any hardware, software or combination of hardware/software capable of executing the steps or functionality of the system as set forth herein. Further, while some of the modules are depicted in FIG. 3 as separate and discrete modules, one of ordinary skill in the art should appreciate that the functionalities of each module may be separated or combined into any number of processing or functional modules without deviating from the scope of the disclosure.

The multi-modal system 300 illustrated in FIG. 3 may be implemented in a multi-mode messaging application ("app") executed on a computing device. The system may include a user interface ("U/I") module 305, a recording/voice recognition module 310, a touch sensor module 315, a memory 320, a messaging module 325, an input/output module 330, a context module 340, and a playback module 345, all interconnected by a bus 301 or other junction device establishing communication between the system components. The system as described in greater detail below may be configured to provide asynchronous, multi-mode communications between one or more users. As used herein, the term "multi-mode" refers to any communication that may include two or more communication modes, including, without limitation, text, audio, video or any combination thereof.

The U/I module 305 may be configured to provide visual, audio and sensory interaction with the system 300. The system 300 may use the U/I module 305 to create and generate displays presented to the user and configured to receive instructions and other messaging information through any number of inputs. For example, a user may interact with the system and the user interface via the touch sensor module 315 which is configured to receive tactile inputs from a user responding to information presented to the user by the U/I module 305. The user may also or instead interact with the system via components or devices in communication with the I/O module 330, including but not limited to, a microphone 335, camera 333 or a headset 332. The I/O module 330 may include a Bluetooth ("B/T") module 331 to establish and control communications with wireless devices such as wearables or headsets. As described in detail herein, the user may generate messaging instructions and content, using any of the input devices, from a lock-screen, application screen or in response to information presented by the user interface. The U/I module may present such information visually on the device display or audibly through a device speaker or headset speaker 332. The U/I module 305 may also interface with the messaging module 325 to generate and display notifications to the user of incoming or received messages. The U/I module 305 may be configured to present such notifications in a lock-screen, pop-up window, or pull down notification tab. According to one aspect, the U/I module 305 may be configured to allow the user to initiate a voicetext message directly from a notification. The U/I module 305 may also issue audio alerts and prompts to be output to the speaker 340 or headset 332.

The recording/voice recognition ("R/VR") module 310, as described in further detail herein may receive audio signals from the input devices, process the audio signals in a speech-to-text-translation module ("S/T") 312 and store both the audio data and the translated text data in memory 320. The text data may also be processed by a natural language understanding ("NLU") module 313 in order to generate further data to be used by the system to determine how to respond. The R/VR module 310 may include a text-to-speech translator ("T/S") 314 that may convert systems commands, prompts, or text message content data into audible signals to be played out by the playback module 345 through the I/O module and the speaker 340 or headset 335. The voice recognition and speech/text translation may be performed locally on the device, or, alternatively, using a cloud-based service over a network, such as one available from Microsoft Corp. The voice and text data may be stored in memory 320 on a temporary, semi-permanent or permanent basis. Memory 320 may include both local memory, such as RAM, ROM, flash memory or the like, as well as any remote memory, such as a data repository server or cloud-based system, accessible over a network.

The context module 350 may determine and control the actions taken by the system using a state machine 352. As described below, the context module's state machine may use natural language data from input voice data as well as other device settings and statuses to drive the current state of the system and its responses. The context module 350 may be configured to process voice data and natural language understanding data from the R/VR module 310 in order to extract the intention of the user from input voice data. The context module 350 may be configured to process and determine, based on the S/T translator 312 and the NLU module 313, what the user is seeking to do. For example, upon initiation of a voicetext message, the R/VR module 310 may record a voice signal translated to text to be "Send a voicetext." The context module 350 may process the voice data and any contextual data provided by the NLU module 313 to determine that additional information is needed. The context module 350 may instruct the U/I module to prompt the user for additional information, in this example, the identity of the intended recipient and subsequently (through another prompt) the message content. As another example, if the voice data recorded by the R/VR module 310 was translated to text as "Say Hello to John Smith," the context module 350, with the assistance of the NLU module 313, may extract the user's intent to send a voicetext to a contact with the name of "John Smith" that states, audibly and visually, "Hello". If the context module 350 determines the system has sufficient information and can determine the intention of the user, the context module 350 may transition the voice and data to the messaging module to be sent out to the recipient 325 as a packaged voicetext, with both audio and text data.

The messaging module 325 may be configured to format and send the voicetext and associated data to its intended recipients. As detailed below, the messaging module may be configured to determine if a recipient user's device is configured to receive voicetext messages or not. Such a determination may control the output format and contents of the voicetext. If the messaging module 325 determines that the recipient user's device is configured to receive voicetext messages, both the voice data and text translation may be packaged and transmitted over the network to the recipient. If the messaging module determines that the recipient device is not configured to receive voicetexts, the messaging module may generate a short-message-service message ("SMS"). In one aspect the SMS message may include the translated text data and a link, such as a HTML link, with a saved network location of the voice data file. The recipient user may activate the link and access the voice data file for downloading or streaming. According to one aspect, the voice file may be linked to a web page allowing the streaming or downloading of the voice file and a link or other information to inform the recipient user of the systems capability and availability.

According to one aspect of the disclosure, the display module 305 may receive a notification from the messaging module 325 and generate a display of the notification data in a notification window presented on a device display, for example a notification screen or lock-screen. In some cases, the notification window may include a prompt allowing the user to respond to the notification. The prompts may include questions and/or available response tasks from which the user may choose to handle the message. The prompts may be in the form of audio or visual prompts and may include response buttons allowing the user to execute the prompt by selecting the desired response task. For example, the U/I module 305 may generate and present on the device display a notification response prompt that asks if the user would like to respond to the message included in the notification. The U/I module 305 may generate and display multiple prompts that give the user a choice in how to handle the received message. A "Yes" button may be presented to initiate a response; a "No" button may be presented which simply dismisses the notification; or a "Voice Reply" button may be presented allowing the user to record an audio message in response.

According to one aspect, the touch sensor module 315 may receive a user's tap or press of the "Voice Reply" button on the device display. Pressing the "Voice Reply" button may activate the microphone 335 into a listening/recording mode. The user's voice may be received and recorded via the microphone 335 and subsequently processed by the R/VR module 310 that translates speech to text. The headset 332 may also include a second microphone (not shown) for receiving the user's voice response. The context of the notification may dictate the subsequent handling of the user's response. For example, the translated text response may be either captured and stored in memory 320 for further user interaction or processing, or sent back to the messaging module 325 as content for initiating or replying to the original message. The audible user response (i.e., voice data) may accompany the text response as it is processed by the messaging module 325. Both of the voice data and the text response may be transmitted to the recipient as part of the response.

Figure 4:
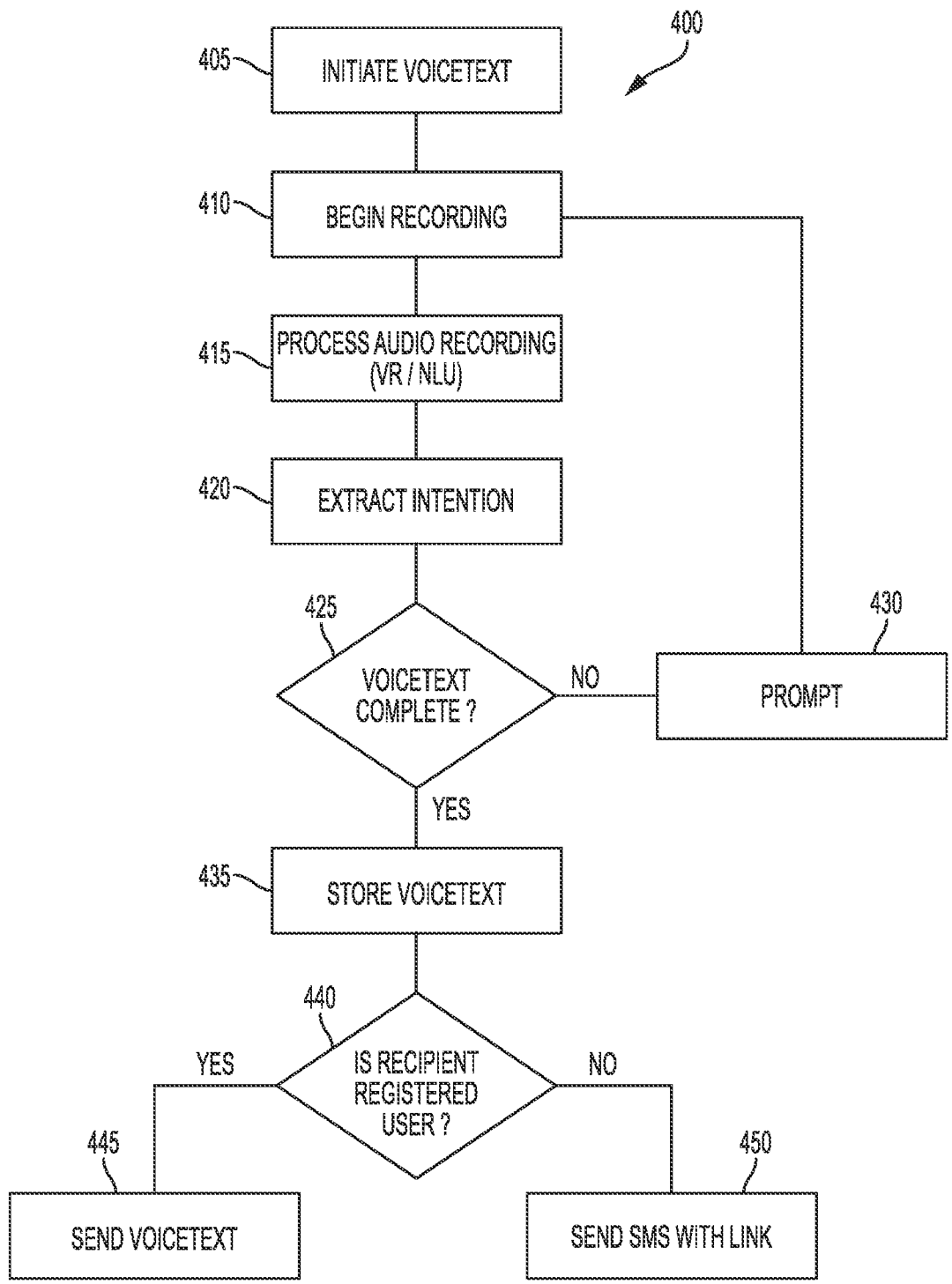
FIG. 4 is a flow diagram of a method implementing asynchronous multi-mode communication, according to one aspect of the present disclosure.

FIG. 4 is a flow diagram of a method 400 implementing a voicetext according to one aspect of the disclosure. As shown in step 405, the method 400 may begin with receiving an initiation input to generate a voicetext message. In one aspect, the system may generate a voicetext to begin a conversation with an intended recipient. Alternatively, the initiation of the voicetext may be in response to a notification received indicating an incoming message from another device. As detailed herein, the system may initiate a voicetext message through one or more inputs from the user, including direct initiation to the user-interface either in the application or a notification screen, through a voice command, or through the use of a command button on a peripheral device such as a headset or earphones.

As shown in step 410, the method 400 may begin recording. In one aspect, the system may issue a recording alert, such as an audible beep or a visual indicator configured to inform the user that the system is beginning to record. The user's voice may be received by the system as audio signals detected by a microphone, either resident on the user device or a peripheral device. According to one aspect the system may continue recording until the microphone no longer detects audible speech. Alternatively, the system may have a set time limit during which the microphone may be open and actively recording. Upon expiration of the time limit, the microphone may become inactive. Additionally, the system may be configured to abort or cancel the recording process if no audio signals are detected once recording begins. According to one aspect the disclosure, if no audio signals are detected within a short period of time, the system may issue a prompt to the user seeking further information. The prompt may be an audio or visual indication, or both, asking if the user wishes to continue or cancel the operation.

As shown in step 415, the method 400 may process the audio recording using voice recognition processor and a natural language understanding processor. The system may transcribe the voice-recognized language and attempt to process the intent of the user by examining the transcription using natural language understanding. As shown in step 420, the system, using the NLU data and contextual information about the state of the device, other voicetext interactions and other data points, may extract a user intention from the recorded voice. For example, if the recording transcription yields "Send a voicetext," the system may determine the user's intent to send a voicetext as well as recognize that the system needs additional information from the user to continue. If the recording transcription includes additional information, such as, "Send a voicetext to John saying 'Hello,'" the system may be configured to parse and recognize the segments of the transcription to generate executable commands to create a voicetext, address it to John, and include the message "Hello" in both voice and text data.

As shown in step 425, the method 400 may determine, based on the extracted intention, whether the voicetext is complete, or if the system needs to prompt the user for additional information. In the case where the recording transcription reads "Send a voicetext," the system may recognize that there is not a complete voicetext and additional information is needed, such as a recipient and message content. If the system determines additional information is needed, the user-interface may generate a prompt to the user for such information. The prompt may be audio, visual or combination of both, and may be extracted from the user in an iterative fashion. For example, first prompting the user for an intended recipient, processing and extracting the intention from the user response, followed by a second prompt seeking message content and additional VR/NLU intent processing.

As shown in step 425, once the method 400 determines that the voicetext is complete the system may assemble the recorded audio file, the transcribed speech-to-text, and other associated data into a voicetext package and store the package. According to one aspect of the disclosure, the system may store the voicetext package on a temporary basis on the device and more-permanent basis on a network or cloud based storage system.

As shown in step 440, the method 400 may determine if the intended recipient is a registered user with a device capable of and configured to receive a voicetext message as packaged with both voice and audio data. A user status check may result in a positive or negative user status. In one aspect, a positive user registration may indicate a registered user who has installed an application embodying the multi-mode, asynchronous messaging system described herein. For example, a central server may keep a log of registered users that may be queried by the sending device using the intended recipients information (such as phone number, email, username, etc.) Alternatively, once a recipient has been identified on the sender's device as a user, the system may log such information on the user device, obviating the need to query a central server. Additionally, the registered user check may occur on a central server as part of the transmission process from the sending device to the central server to the recipient device. One skilled in the art should appreciate that the location, and timing of the registered user check is not limited to any particular location or time sequence within the entire method 400.

As shown in step 445, if the system determines that the recipient is a registered user (a positive user status), the package including the voice and text data is sent over the network to the recipient. The recipient device, upon receiving the voicetext may process the package in a number of ways depending on the contextual state of the device and present use by the recipient. If the recipient device is in a hands-free mode, or the recipient is connected to a headset or other audio-capable peripheral, the recipient's device may playback the audio file containing the sender's voice, introduced by an informational statement or prompt by the system. For example, if the recipient is connected to a headset and a voicetext message is received, the recipient device may issue a contextual prompt saying "New Message from Sally. Would you like to hear it?." The recipient device may also or instead skip the prompt and directly initiate playback of the senders audio portion of the voicetext. According to one aspect, the system may recognize the context of multiple messages exchanged between users in a short period of time. In such a scenario, the system may simply play back the synchronous messages without the prompts, thereby reducing the lag and response times associated with inter-device communications. In this situation the system may skip additional prompts on the sender's device if the system determines there is sufficient data to send a message. If a series of voicetexts has been processed between two users in rapid succession, the system may determine that, based on the context of incoming and outgoing messages, certain prompts are unnecessary and the system can determine any missing information given the context. For example, the system may determine that it is unnecessary to prompt the user for an identification of an intended recipient when the sender has been messaging the same recipient a number of times in a short time period.

As shown in step 450, if the method 400 determines that the intended recipient is not a registered user (a negative user status), the system may convert the voicetext package to an SMS message that contains the speech-to-text transcription and a hypertext link to a network location where the user may download or stream the voice data directly from the network location. In one aspect the SMS message or the network location may include additional information, such as promotional information encouraging the recipient to register with the system. The SMS may further include advertising or other sponsoring information.

The notification display may include a variety of information including originating information such as the contact name or number of the second user (sender), and a portion of the message content. Other message information such as a time-stamp, the application from which the originating message was sent, or a response prompt may also be generated as part of the notification display.

Figure 5:
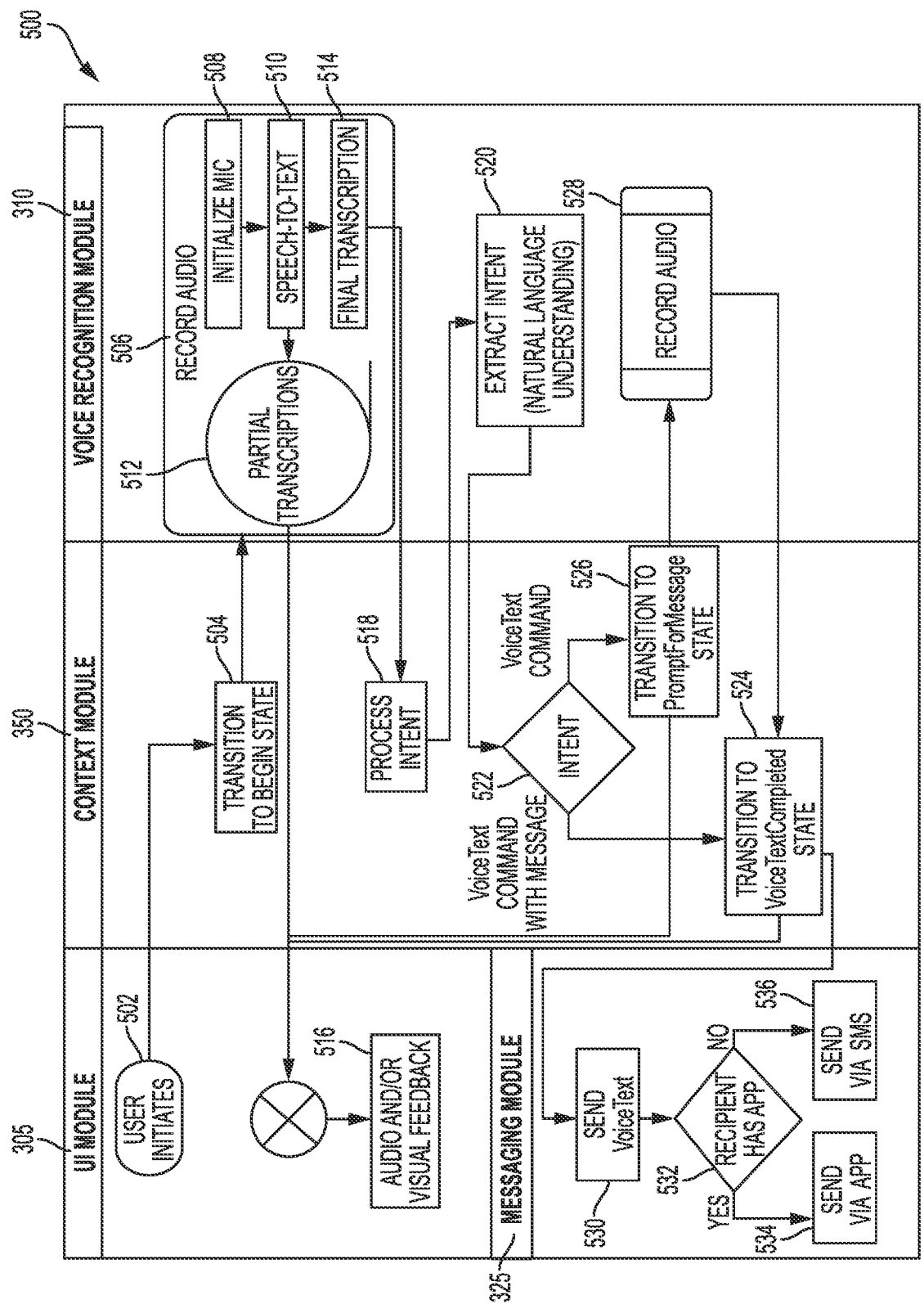
FIG. 5 is a flow diagram of a method implementing asynchronous multi-mode communication, according to one aspect of the present disclosure.

Turning now to FIG. 5, a flow diagram 500 of an asynchronous multi-mode (voicetext) operation is depicted, in accordance with one aspect of the disclosure. For clarity, the operational flow diagram of FIG. 5 overlays certain functional system modules described above and depicts operational states of an exemplary state machine, depicted in FIG. 6 and discussed hereinafter. One skilled in the art should appreciate that the system modules, and overlaid process steps and the associated states of the state machine may be implemented in other configurations and arrangements without deviating from the scope of the present disclosure.

A shown in step 502, the method 500 may begin with a user initiation of the process, system or application. The system may initiate the voicetext process from the U/I module 305 described previously. The user initiation may be in the form of tactile interaction with a device display, speech or voice activated interaction with a device or headset microphone, a command button located on a headset or other peripheral device, or a combination of the three.

As shown in step 504, the system may transition to a "Begin state." The state machine, as described in greater detail below, may be implemented in the context module 350 where the present status of the device and interactions with the user are determined in a manner to further direct the system. As shown in step 506, after the device enters the Begin state, the system may begin to record audio. Recording audio, according to one aspect, may begin immediately, or may follow an audible or visual alert configured to inform the user that the device is entering a live recording session in which the microphone will be active and audio signals will be recorded. Following the alert, as shown by step 508 the system may initialize the microphone to begin recording the user's voice. As shown in step 510, the received voice data is processed by a speech-to-text translator. The system may determine, as shown in step 512, that the audio recorded is either incomplete or indecipherable which may lead to the U/I module 305 issuing an audio or visual feedback (step 516) to the user to prompt the user to begin again or seek further instruction from the user. As shown in step 514, if the speech-to-text translation is successful and a final translation is obtained, the system may then inform the context module that a state change is appropriate.

As shown in step 518, the system may transition to a Process Intent state driven by the context module. As previously detailed, during the Process Intent state, the system is tasked to determine the intent of the user based on voice data, NLU and additional contextual data. As shown in step 520 the system may rely on NLU to extract the meaning of the recorded voice data (converted to text). As shown in step 522, the context module may determine the intent of the user. If, as shown in step 526, the context module 305 determines that the translated language is a voice text command (e.g., a simple command to "Send a Voicetext") without more, the system may prompt the user, as shown in step 528, to record additional audio with the information sought. Once the additional audio is recorded and processed, and no additional information is needed, the system may transition to a voicetext completed state as shown in step 524. If the context module determines that the translated language includes both a voicetext command and all necessary message information (such as intended recipient and message content), the system may transition to the voicetext completed state.

Once the system transitions to a voicetext completed state, as shown in step 530, the messaging module 325 may package the relevant data, including the voice data and the text data into a message format for transmission. The messaging module, as shown in step 532, may determine if the intended recipient is a registered user of application. As described previously and shown in step 534, if the user is a registered user, the voicetext is sent out to the network and to the recipient's device. If, however, the intended recipient is not a registered user, as shown in step 536, the translated text may be sent to the user in an SMS format and may include a link to a network location where the recipient can download or stream the voice data.

Figure 6A:
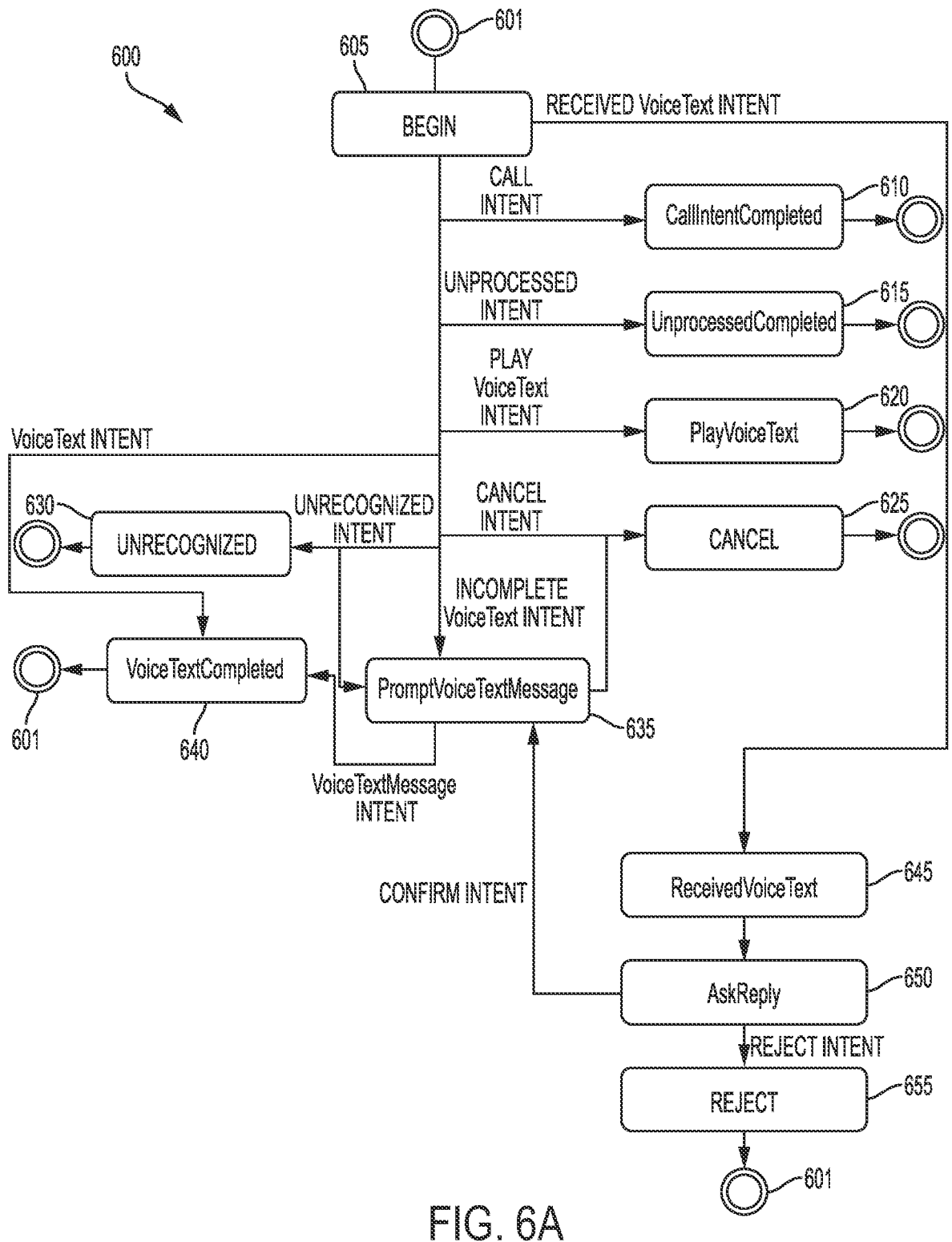
FIGS. 6A-B depict an exemplary state machine, according to one aspect of the present disclosure.

FIG. 6 depicts an exemplary state machine 600 in according to one aspect of the present disclosure. The state machine 600 may include a plurality of states, each of which have a method and a transition, which according to one aspect of the disclosure, accepts a parameter for the intent determined after the speech-to-text/NLU intent extraction is completed. For the purposes of clarity, the end states 601 are separately shown following the states and methods. As previously described the Begin state 605 occurs upon the initiation of the system by a user with a tactile, voice, command button or combination input. From the Begin state 605, the system and the contextual module in particular, may determine the intent of the user based on the processed voice data. The states and transitions between states depicted in FIG. 6 are the results of the voice recognition and NLU processors determining the intent of the user. In one instance, the system may determine a Call Intent, in which the translated voice data indicates the user intends to make a phone call. For such a determined intent, the system may transition to a Call Intent Completed state 610 and the user device may begin the process of initiating a phone call.

The state machine, in one aspect, may transition to a Unprocessed Completed state 615 if the user's intent is not processed by the system. An unprocessed state may result from a device or software error, or other malfunction or interruption that prevents the contextual module from processing the voice data to determine the user's intent.

A Play Voicetext state 620 may represent a state by which the contextual module determines the user's intent to retrieve and listen to a previous voicetext message. According to one aspect, the system may allow the user to recall stored messages (stored locally or remotely) and listen to the voicetexts.

A Cancel state 625 may be entered if the system determines the user wishes to cancel a voicetext, replay or other interaction with the system.

An Unrecognized state 630 may represent a system state in which the system cannot recognize or adequately process the voice data sufficiently enough to extract an intent. The Unrecognized state may result in a transition to Prompt Voicetext Message 635 in which the system may issue a prompt to the user seeking clarification or informing the user that the system does not recognize processed voice data as viable instructions. The Prompt Voicetext Message state 635 may also be invoked when the system determines an incomplete voicetext intent. For example, if the system determines the user intends to send a voicetext, but requires additional information, the system may transition of the Prompt Voicetext Message State for further prompting, receiving and processing additional voice data to execute a voicetext message. If the prompt goes unanswered, or is otherwise unrecognizable, the system may transition to the Unrecognized state 630. If the prompting and subsequent processing is successful, the system may transition to the Voicetext Completed state 640 for processing and transmitting the message out to the network.

The system state machine may also transition from the Begin state 605 to the Voicetext Completed state 640 if the system determines the user's intent is to send a voicetext and all the message information has been included with the user's initial voice data or can be determined by the context of the devices recent activities (i.e., multiple messages between the same users in a short period of time indicating no prompt for a recipient is needed).

The system may, upon receiving a voicetext from another user, transition to a Received Voicetext state 645. The system may then move to an Ask Reply state 650 during which the system may ask if the user wishes to respond to the received voicetext message. If the user's response to the system indicates that no reply is forthcoming (either affirmatively or by silence) the system may transition to a Reject state 655 ending the interaction. If the user's interactions indicate an intent to reply, the system may transition to the Prompt Voicetext Message state 635 to prompt and obtain additional instructions or voicetext message content from the user.

Figure 6B:
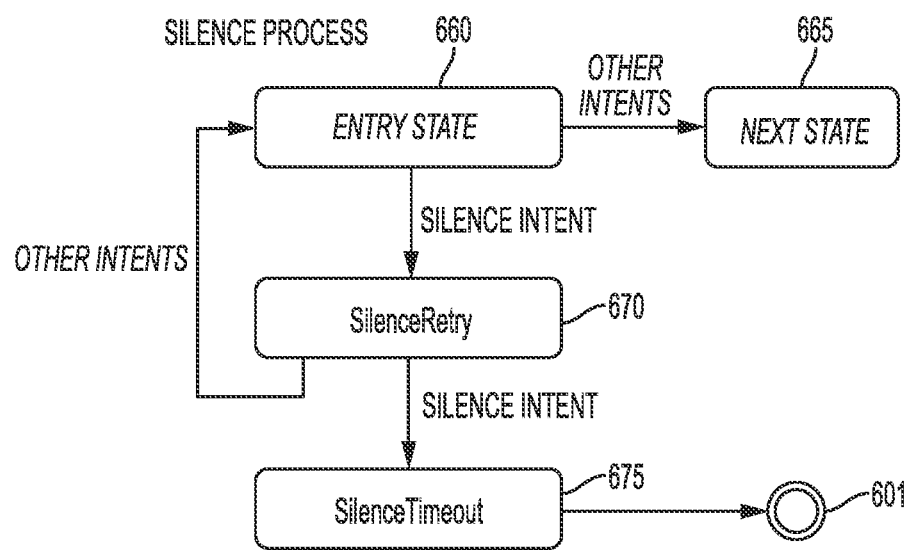

FIG. 6B depicts additional silence states of an exemplary state machine according to one aspect of the present disclosure. The machine states (represented generally as the Entry State 660), may transition into a Silence Retry state 670 in certain circumstances instead of transitioning to an appropriate processing state (represented generally as the Next State 665). If, in response to any of the state transitions described herein, the system is met with silence or does not detect or pick-up a user's voice response to a prompt, the system may transition to a Silence Retry state 670 in which the system may repeat a prompt or notify the user that the system did not capture an audible response. The Silence Retry state 670 may then transition into a Silence Timeout state 675 if there is a second period of silence where the system may end the interaction. Alternatively, if the system is able to detect a non-silence intent after the retry, then it reverses to the previous Entry State 660 and transitions from that state with the new intent.

Figure 7:
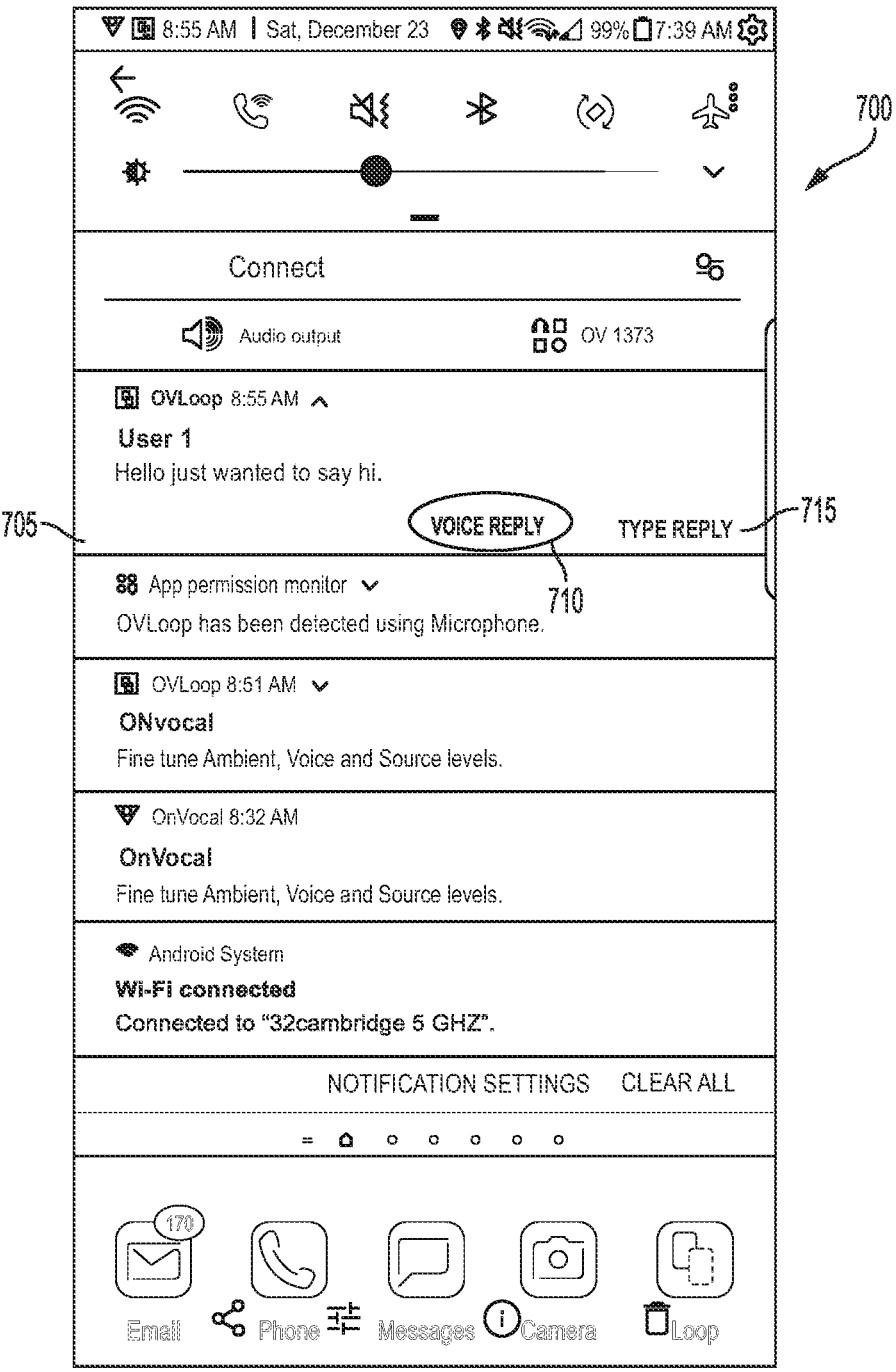
FIG. 7 depicts a display diagram of a voice reply button and banner alert notification display, according to one aspect of the present disclosure.

FIGS. 7-11 depict a series of display diagrams illustrating an exemplary use of the system, according to one aspect of the disclosure. FIG. 7 depicts a display diagram 700 of a banner notification window 705 including a "Voice Reply" button 710 according to the disclosure. The banner notification window 505 may be displayed over the top of a lock-screen or home screen or may be accessed by pulling down a notification banner from the top of the device display. The "Voice Reply" button 710, when pressed may activate the system's process for recording a voice reply to the originating message. The banner notification may further include a "Type Reply" button 715 allowing the user to enter a text response to the originating message in a traditional manner.

According to one aspect of the disclosure, the system may display a calendar notification window that includes connection information such as a conference call number listed on the event. The display module may generate or retrieve and display a question, such as "Would you like me to connect you?" The notification window may further present one or more prompts, such as "Yes" or "No". The calendar notification may include a third-party web conference service listed on the event, and generate a question such as "Would you like me to open the XXX and connect you?"—the notification would display the prompt "Yes", "No" (where XXX is the name of the app or service). The system, depending on the response from the user may link to the third-party web conference via an application interface.

According to the one aspect of the disclosure, the system may also play a notification or message content for the user in addition to presenting the notification window on the device display. In one aspect, the system may generate an audio signal relating certain information about the incoming message, such as from whom the message was sent (i.e., "Message from XYZ"), followed by a read-out of the message and a request prompt seeking instructions form the user. The messaging module may send the incoming message content and its associated metadata to the voice recognition module for a speech/text translation. Upon completion of the translation the speech data may be sent to the playback module for playing out from the device speaker or headset/headphone output. The app may also use audible prompts to pose response questions to the user. For example, the system may present an audible question "Would you like to reply?" after displaying or playing back the incoming message. In response the user may say or tap a "Yes" or "No" or simply ignore. If the user says "Yes" to reply, an audio prompt may be played to the user saying, for example, "Recording reply now." If the user pauses, the system may ask, "Would you like me to send or continue recording?" The user may reply and the reply would be processed accordingly. Alternatively, the user may say or press "Cancel" to terminate the dialog and response. The system may be configured to enable or disable the automatic readout of the notification and message content based on predefined settings set by the user.

Figure 8:
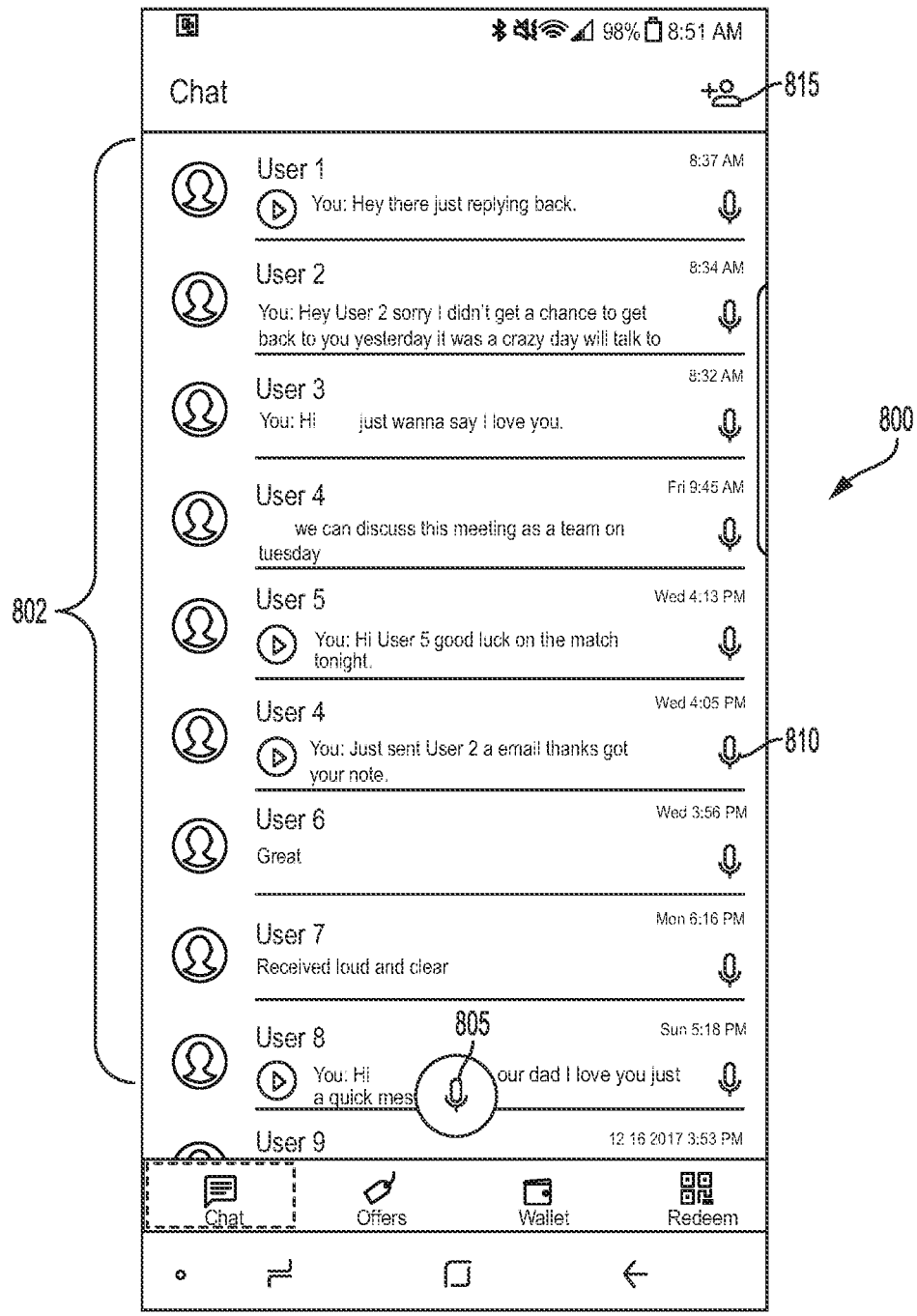
FIG. 8. depicts a display diagram of an application user interface in accordance with one aspect of the present disclosure.

FIG. 8 depicts a display diagram 800 of an application user interface in accordance with one aspect of the present disclosure. The user interface may include a list of voicetext conversations 802. Each conversation, according to one aspect may include a direct voicetext record button 810 which will place the system directly into a recording mode without requiring the user to open the conversation to a separate display. The system may use the contextual information related to the particular conversation for which the direct voicetext button 810 was activated in order to determine aid the determination of the user's intent without prompting.

The user interface may further include a recording button 805 presented to a user as an overlay on top of the conversation list. Activation of the recording button 805 may place the system into a recording mode. Activating the recording button 805 by itself may begin the recording process with little or no contextual data to assist the determination of the user's intent. If the user does not give a full instruction allowing the system to fully determine intent, the system may issue one or more prompts in order to gather such information. An add conversation button 815 may be presented that, when activated, may open an message template for the user to complete to establish a voicetext conversation. Alternatively, the system may issue audible prompts in response to activation of the add conversation button, relieving the user of having to type or enter data or messaging information.

In one aspect the record button 805 may function according to a press-and-hold configuration in which the user maintains tactile pressure on the recording button 805 while the user speaks into the microphone. Alternatively, the user may be presented with "Start" and "Stop"-like buttons freeing the user from a continuous press of the recording button. Once the user has recorded the audible user response, the user may un-press the recording button 805 (or press a "stop" button). The recorded voice data of the audible user response may then be sent to the voice recognition module for processing. According to one aspect, the record button 805 may be configured such that, during a press-and-hold interaction with the user, the user may slide the recording button 805 up or down, to cancel the recording. An instructional message may be displayed informing the user of such an option. The record button 805, and any other buttons described herein, may also be configured to generate a haptic feedback when the user presses or releases the button. For example, upon pressing a hold-to-record, the system may generate a first vibration when the user first presses the button and a second vibration when the user releases. The second vibration may inform the user that the recording has inadvertently stopped, leading the user to re-initiate the response procedure.

Figure 9:
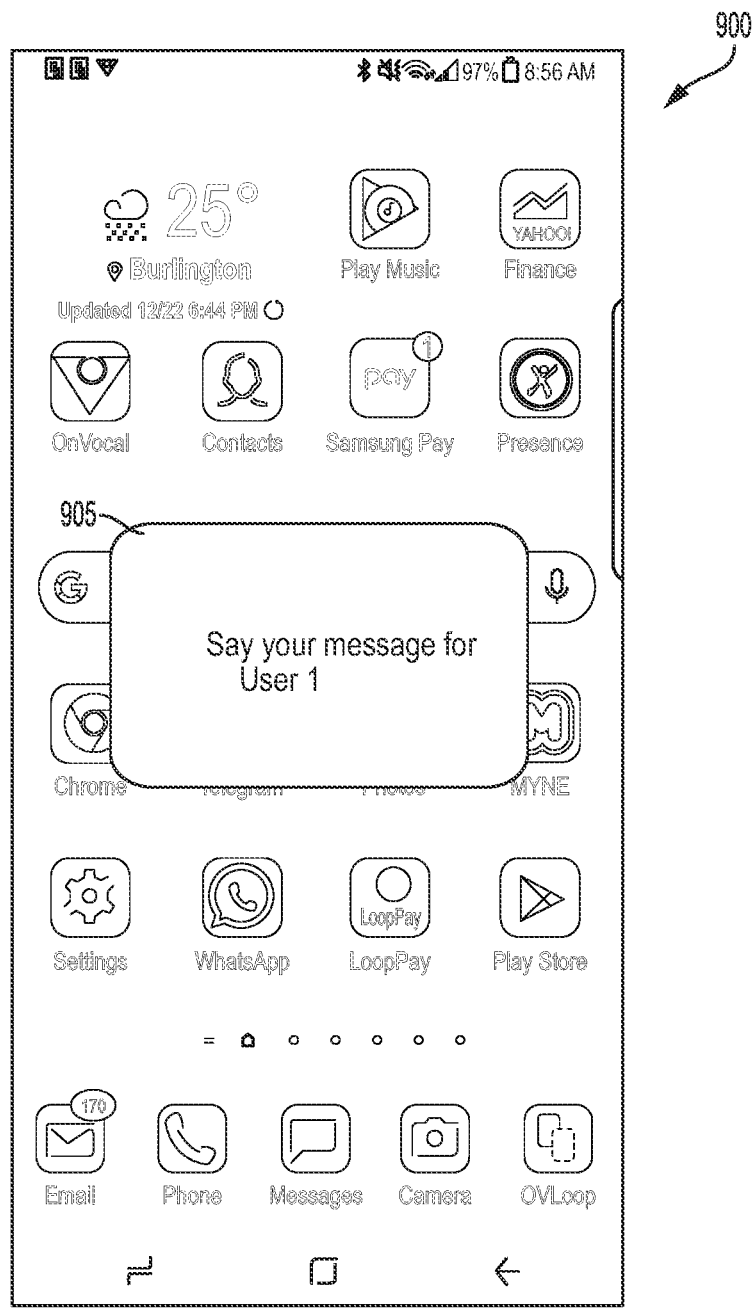
FIG. 9 depicts a display diagram of the system's user interface response to the initiation of a voicetext with some contextual information, according to one aspect of the present disclosure.

FIG. 9 depicts a display diagram 900 of the system's user interface response to the initiation of a voicetext with some contextual information, when the user is not directly interacting with the user-interface, such as using a headset, for example. When the system begins recording, using a voice command, for example, the user interface may generate a display prompt 905 as well as an audio prompt instructing the user to provide additional information. The display of display diagram 900 may be in response to a user issuing a voicetext command to "Voicetext User 1" to which the user interface may generate the prompt 905 stating "Say your message for User 1." The dual-mode prompting of both audio and visual prompts provides redundancy to user in a situation where the user cannot access one mode or the other.

Figure 10:
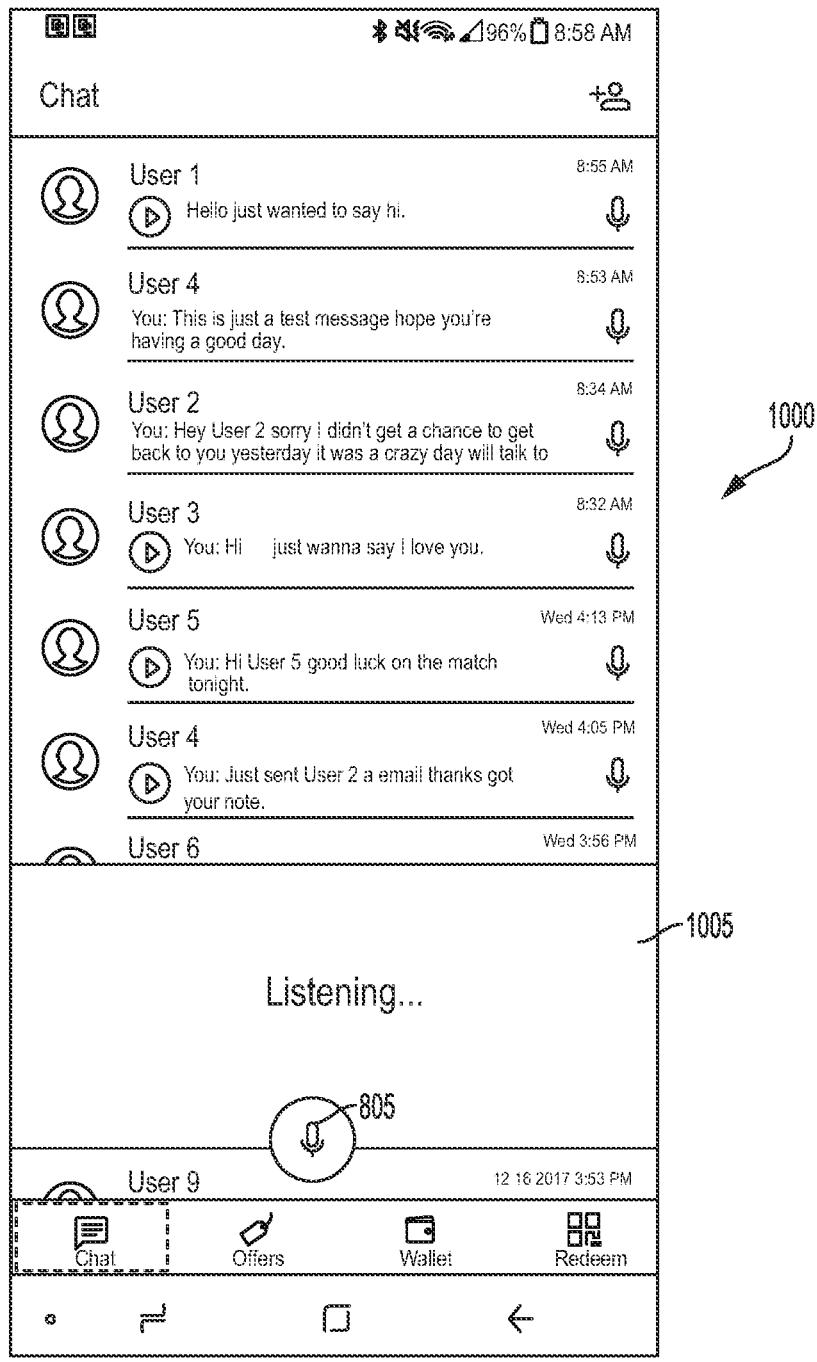
FIG. 10 depicts a display diagram of a user interface display during a listening operation, according to one aspect of the present disclosure.

FIG. 10 depicts a display diagram 1000 of a user interface display during a listening operation. In a situation where the user presses the recording button 805 from inside the system application, the user interface display may generate a status display 810 informing the user that the system is listening for the user's voice. Additional messages generated by the user interface and presented in the status display may include, without limitation, "sending," "cancelling," "playing," or the like.

Figure 11:
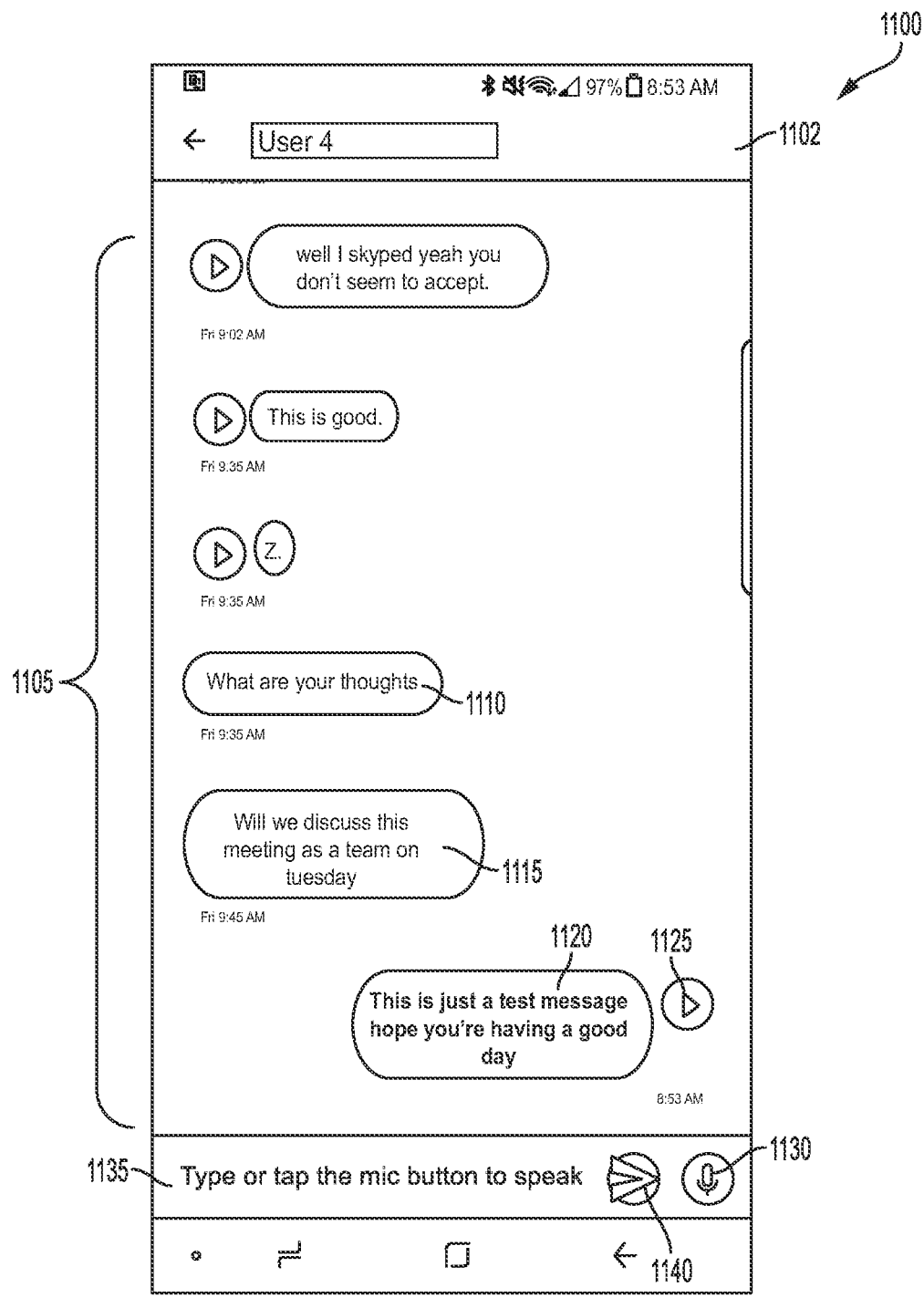
FIG. 11 depicts a diagram of a display showing an interactive multi-mode conversation thread between two users, according to one aspect of the present disclosure.

FIG. 11 depicts a diagram 1100 of a display showing an interactive multi-mode conversation thread 1005 between two users, according to one aspect of the present disclosure. A display may list a series of the most recent messages 1110, 1115, 1120 between one or more members of the conversation as well as a header 1102 indicating the member or members of the conversation. The exemplary display may further indicate which messages were voicetext messages including both voice and text, or messages including text only. In one aspect, a play button 1125 or other indicator may be presented adjacent to the text of a voicetext message 1120. Other messages 1110, 1115 that do not display a play button may be text only message with no voice component. The thread display may also include a voicetext record button 1130, that when activated may begin the voicetext recording process, as described herein. The conversation thread display may also include a text entry box 1135 where a user may input a text message and send the text using a send button 1140.

Figure 12:
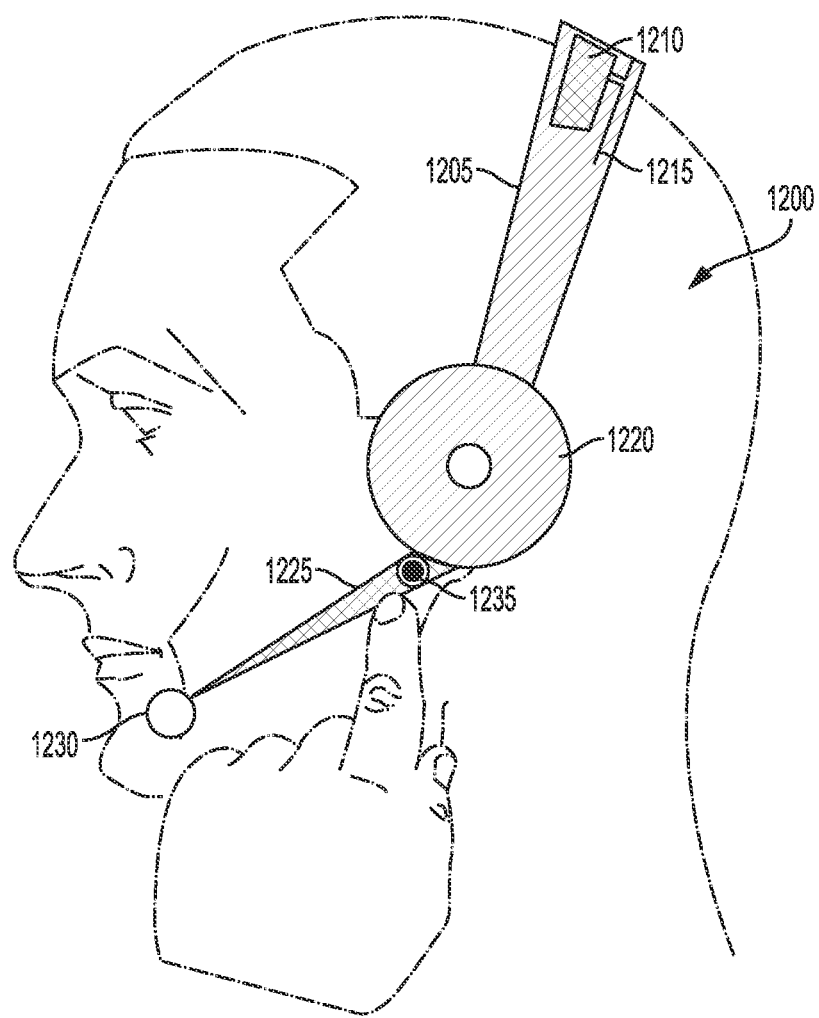
FIG. 12 depicts a user wearing an exemplary headset, according to one aspect of the present disclosure.

FIG. 12 depicts a side view of a user wearing a smart headset 1200, according to one aspect of the present disclosure, for implementation of the functionality described herein in a substantially hands-free mode. The illustrative smart headset may provide additional functionalities over standard headphones or earbuds. Illustrative examples of such headsets are disclosed in U.S. patent application Ser. No. 15/839,119, filed Dec. 12, 2017, the contents of which are hereby incorporated by reference in their/its entirety. While certain technical advantages and solutions are presented in the context of a wearable device, such as a smart headset, one of ordinary skill in the art will recognize that the technical advantages and solutions to the difficulties of inter-device communication, are not borne solely from such peripheral devices, and may be readily accomplished using the system alone or in conjunction with peripheral devices as detailed herein.

According to one aspect, a smart headset 1200 may include a frame 1205 that may house or otherwise contain circuitry 1200 for driving and controlling the functionality of the headset and an antenna 1215 in communication with the circuitry 1200 for establishing a wireless connection to a device. The headset 1200 may include one or more channels 1220 affixed to the frame 1205 with speakers for outputting sound to a user's ears. The channels 1220 may be in the form of over-the-ear earphones, or in the form of earbuds or the like that are at least partially inserted in the user's ear. A headset arm 1225 including a vocal pick-up 1230 may extend from the frame in a moveable fashion to allow the user to adjust the position of the vocal pickup 1230 in relation to the user's mouth. It should be appreciated that vocal pick-up technology may be implemented with multiple microphones disposed along a portion of the headset or wearable device, as opposed to residing on a "boom" as depicted in FIG. 12. The vocal pickup 1230 may act as a microphone receiving audible signals from the user and transmitting those signals to the headset circuitry 1210, which in turn may broadcast the audio signals from the antenna 1215 to the user's device (not shown). The headset 1200 may also include an action or command button 1235 disposed on the arm 1225 or in another convenient location on the frame 1205. The command button 1235 may be configured to drive certain actions executed by the system. For example, the command button 1235 may replicate many of the tactile functions a user experiences using the device display. The command button 1235 may be pressed to activate the microphone in the vocal pickup 1230 and subsequently pressed to deactivate the microphone, indicating the user is done recording. Alternatively, the command button 1235 may be configured to require a continuous actuation to replicate the "press and hold" functionality described above. In operation, the headset may replicate the audio signals and functionality of the speaker and microphone resident on the device itself. According to one aspect, as described below, the command button 1235 may also be used to wake up the device or initiate a messaging operation by prompting the user for instructions. According to another aspect of the disclosure, the system may be configured to have the microphone in an "always-on" mode during which the system may listen for and detect a wake-up command to initiate a multimode message. For example, a user may state "Multi-Mode Message," to which the system may begin the messaging process with an audible prompt seeking further instructions from the user, such as "What would you like to do?" or "Who would you like to contact?"

According to one implementation a user may communicate with the system through a smart wearable headset connected to the user device (wired or wirelessly). A user may interact with the headset to initiate a voicetext using the command button 1235 or a wake-up command, or user interaction may include a response to a voicetext or other message notification. For example, the system may cause the headset 1200 to vibrate and/or provide a tone to the channel speakers 1220 indicating to the user a notification has been received. The system, through the headset microphone 1230 may listen or wait for a predetermined amount of time for a voice response. In addition to generating a notification with actionable display buttons like a "Voice Reply" display button on the display, the system, when connected to a smart headset, also may "listen" for the user to either speak a voice activation phrase like "Reply," "Yes," "No," or other contextual response to the system's audible prompt. Additionally, the system may be configured to receive a short press of the command button on the headset within a few seconds of the notification, and subsequently playout the notification via audio using the speech/text translator of the voice recognition module. The user may then listen to the notification. At the end of the audio notification, the system may prompt the user for a response such as "Would you like to reply?" or other contextual prompt if the nature of the notification requires a response. The system intelligence may determine from the content of the message or notification the appropriate prompts to offer the user. For example, if the notification relates to a calendar reminder, such as a dial-in conference, the system may prompt the user, "Would you like to dial-in now?" The context and content of the notification and message content may control the prompts offered to the user. The command button may be further configured such that a short press will play voice message and present an appropriate contextual prompt again.

While the aspects described herein detail the use of a smart headset, one of ordinary skill in the art will recognize that any number of headset configurations may be implemented with the system without deviating from the scope of the disclosure. For example, earphones or earbuds commonly packaged with mobile devices often include an in-line remote with volume control and a command button. The system may be configured such that the command button of the earbuds provides the same functionalities as that of the smart headset command button.

According to an aspect of the disclosure, in a message conversation context depicted in FIG. 11, in which a first user receives a voice file of a second user being played as the notification itself, the voice reply response may be initiated by the user pressing and holding the command button on a headset within a few seconds of receiving the notification. The system may begin recording the first user's voice response and stop recording when the user lets go of the command button. The system may then automatically process the message, as described above, and send the voice reply audio and text to the second user. If the second user responds in a similar manner within a few seconds (or other short time period) of the notification being received, the system may establish a dedicated intent on the part of both uses and initiate an asynchronous, walkie talkie-like session. The system may immediately play the first user's voice recording to the second user's headset without waiting for a short press or spoken command. A walkie talkie-like session may entail the users continuously receiving and sending voice notifications and responses; thus establishing a perceived intent to continue an asynchronous message conversation without the time consuming and cumbersome actions of unnecessary prompts, typing, and additional instructions.

Once the asynchronous walkie talkie-like session starts, the interactive conversation may continue by using the command button in a "hold-to-talk" mode. Alternatively, a user may select, within the system, a hands free mode, in which even without holding the command button down the system may wait for the voice of the user immediately following a voice message being played to activate the recording. The walkie talkie-like session may continue until a time-out occurs for one of the users (i.e., responding outside of 10 seconds, for example) or the session is interrupted by another notification, phone call or other high-priority device operation, after which the users may need to reestablish the asynchronous session. If a user does not respond to the last voice message through a "hold-to-talk", voice activated response, or otherwise respond (e.g., within 10 secs of the message starting to play), then it is assumed the voice message or notification is being ignored on purpose. According to one aspect, the system's messaging functionality may translate all voice to text and record it in a chat session even during "walkie talkie" mode.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system for asynchronous multimode communication, the system comprising:
    an input/output module configured to receive a voice input from a user and output a notification indicating an incoming message;
    a speech recognition module configured to receive the voice input from the input/output module and translate the voice input from speech to translated text;
    a context module configured to determine an intent based on the translated text received from the speech recognition module;
    a memory configured to store the voice input received at the input/output module and the translated text received from the speech recognition module;
    a messaging module configured to determine a status of an intended recipient device, the status indicating if the intended recipient device is configured to receive a multi-mode, asynchronous message package including both the voice input and the translated text received from the speech recognition module, generate the multi-mode, asynchronous message package upon determination of a positive status that indicates the intended recipient device is configured to receive the multi-mode, asynchronous message package, and transmit the multi-mode, asynchronous message package to a network based on the intent determined by the context module;
    a text to speech translator configured to translate the notification output from the input/output module to an audio file; and
    a playback module configured to receive the audio file from the text to speech translator and output the audio file to a speaker.

2. The system of claim 1 further comprising a natural language understanding processor configured to analyze the voice input from the input/output module, the context module configured to determine the intent based on the translated text received from the speech recognition module and natural language understanding processing from the natural language understanding processor.

3. The system of claim 1 wherein the context module is further configured to generate a prompt upon determining the intent is incomplete.

4. The system of claim 3 wherein the prompt comprises an audible request for message information.

5. The system of claim 4 wherein the message information is one of a contact identification or message content.

6. The system of claim 1 wherein the input/output module is configured to receive a tactile or voice triggered input from the user, the tactile or voice triggered input activating a microphone to receive the voice input.

7. The system of claim 6 wherein the tactile input comprises an icon selection corresponding to a stored contact.

8. The system of claim 6 wherein the tactile input comprises activation of a command button on a peripheral device.

9. The system of claim 8 wherein the peripheral device is one of a headset, earphones, earbuds, smartwatch, smart speaker or wearable device.

10. The system of claim 8 wherein the microphone is located in the peripheral device.

11. The system of claim 1, wherein the notification includes message content.

12. The system of claim 1, wherein the context module is configured to further determine the intent based on a period of time between receiving the multi-mode, asynchronous message package and receiving one of the voice input or a tactile input.

13. The system of claim 1 wherein, upon determination of a negative status indicating the intended recipient device is not configured to receive the multi-mode, asynchronous message package, the messaging module is further configured to transmit the translated text and a network location of the multi-mode, asynchronous message package in a short messaging service message.

14. A method of asynchronous multi-mode communication comprising: receiving a voice input from a user; output a notification indicating an incoming message; translating the voice input from speech to text; determining a context-based intent from the text; storing the voice input and text; determining a status of an intended recipient device, the status indicating if the intended recipient device is configured to receive a multi-mode, asynchronous message package including both the voice input and text; generating the multi-mode, asynchronous message package upon determination of a positive status that indicates the intended recipient device is configured to receive the multi-mode, asynchronous message package; transmitting the multi-mode, asynchronous message package to a network, the multi-mode, asynchronous message package based on the determined intent; translating the notification to an audio file; and outputting the audio file to a speaker.

15. The method of claim 14, wherein determining the context-based intent comprises analyzing the text using a natural language understanding processor.

16. A system for asynchronous multimode communication, the system comprising:
   an input/output module configured to receive an initiation input and output a notification indicating an incoming message;
   a recording module configured to receive a voice input from a user following the initiation input;
   a speech recognition module configured to receive the voice input from the recording module and translate the voice input from speech to text;
   a context module configured to extract an intent from the text received from the speech recognition module and upon a failed extraction of intent, generate a prompt for additional message information, the recording module configured to receive additional voice input from a user;
   a memory configured to store the voice input received at the recording module and the text received from the speech recognition module;
   a messaging module configured upon a successful extraction of intent determine a status of an intended recipient device, the status indicating if the intended recipient device is configured to receive a multi-mode, asynchronous message package including both the voice input and text, generate the multi-mode, asynchronous message package upon determination of a positive status that indicates the intended recipient device is configured to receive the multi-mode, asynchronous message package, and transmit the multi-mode, asynchronous message package to a network based on the intent determined by the context module; and
   a text to speech translator configured to translate the notification output from the input/output module to an audio file.

17. A system for asynchronous multimode communication, the system comprising: an input/output module configured to receive a voice input from a user and output a notification indicating an incoming message; a speech recognition module configured to receive the voice input from the input/output module and translate the voice input received at the input/output module from speech to text; a memory configured to store the voice input received at the input/output module and the text received from the speech recognition module; a context module configured to determine an intent based on the text received from the speech recognition module; and a messaging module configured to determine a status of an intended recipient device the status indicating if the intended recipient device is configured to receive a multi-mode, asynchronous message package including the voice input and the text received from the speech recognition module, generate the multi-mode, asynchronous message package upon determination of a positive status that indicates the intended recipient device is configured to receive the multi-mode, asynchronous message package, and transmit the multi-mode, asynchronous message package to a network based on the intent determined by the context module; a text to speech translator configured to translate the notification output from the input/output module to an audio file; and a playback module configured to receive the audio file from the text to speech translator and output the audio file to a speaker.

18. The system of claim 17 wherein the input/output module is configured to receive a tactile or voice triggered input from the user, the tactile or voice triggered input activating a microphone to receive the voice input.

19. The system of claim 17 wherein upon receiving the voice input, the system translates the voice input received at the input/output module from speech to text via the speech recognition module, and transmits the multi-mode, asynchronous message package to the network without additional action required by the user.

20. The system of claim 18 wherein the tactile input comprises an icon selection corresponding to a stored contact.

21. The system of claim 18 wherein the tactile input comprises activation of a command button on a peripheral device.

22. The system of claim 21 wherein the peripheral device is one of a headset, earphones, earbuds, smartwatch, smart speaker or wearable device.

23. The system of claim 18 wherein the tactile input is one of, one tap of an icon or button in a mobile application or a web page to start recording and detection of a user pause in speech to stop recording; or press and hold of a button in an app or on the web page to record and release the button to stop recording.

* * * * *